J. F. HENNESSY.
FABRIC CUTTING APPARATUS.
APPLICATION FILED JAN. 26, 1920.
1,423,798.
Patented July 25, 1922.
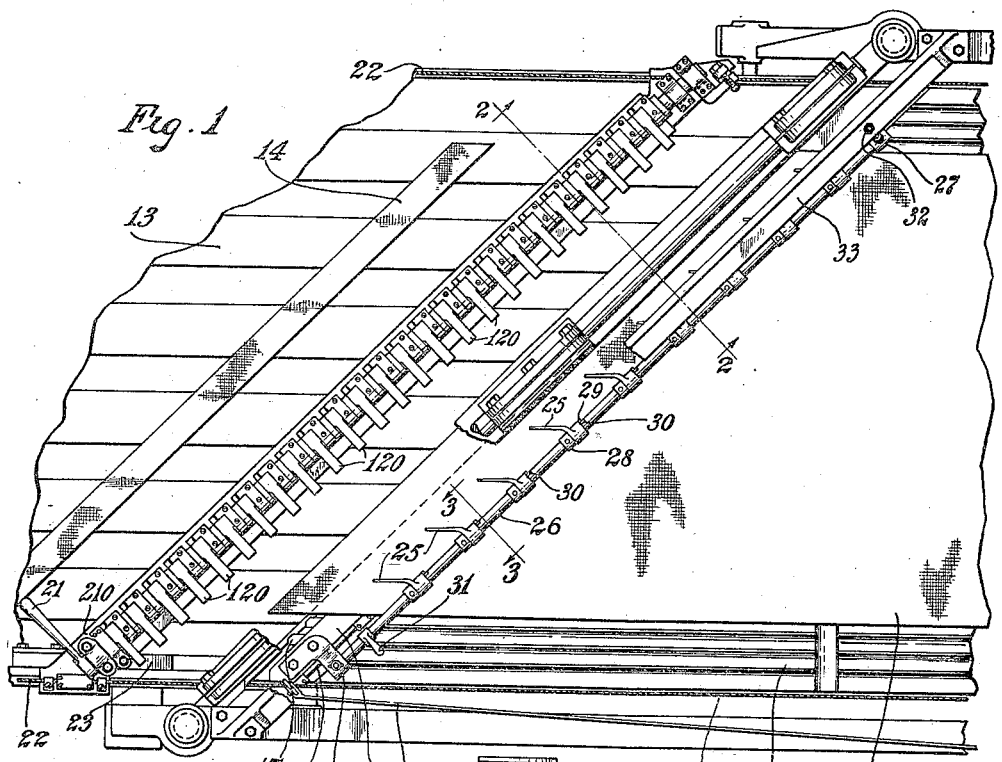
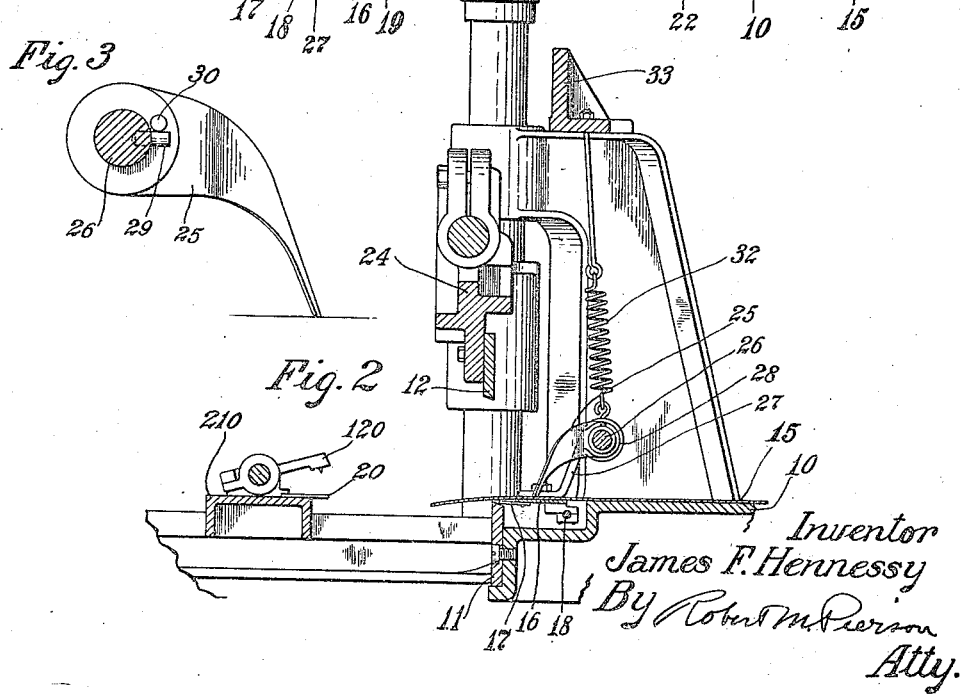
Inventor
James F. Hennessy
By Robert M Pierson
Atty.

UNITED STATES PATENT OFFICE.

JAMES F. HENNESSY, OF AKRON, OHIO, ASSIGNOR TO THE B. F. GOODRICH COMPANY, OF NEW YORK, N. Y., A CORPORATION OF NEW YORK.

FABRIC-CUTTING APPARATUS.

1,423,798.  Specification of Letters Patent.  Patented July 25, 1922.

Application filed January 26, 1920. Serial No. 353,915.

*To all whom it may concern:*

Be it known that I, JAMES F. HENNESSY, a citizen of the United States, residing at Akron, in the county of Summit and State of Ohio, have invented a certain new and useful Fabric-Cutting Apparatus, of which the following is a specification.

This invention relates to apparatus for cutting strips of a predetermined width from a sheet of material which is advanced between cuts to bring a given width of the material beyond a cutting device and is held stationary during the operation of the device to sever a strip from the sheet. The invention finds a particular application in apparatus used to cut rubberized fabric on the bias into strips to be employed in the building of tire carcasses. The principal object of my invention is to insure that the gripping fingers which seize and advance the sheet will always grip the leading edge thereof to the same depth or rearward extent, and that the sheet will remain in its advanced position without slipping backward, so that the cut-off strips will be of the desired uniform width.

Of the accompanying drawings:

Fig. 1 is a plan view of a part of a fabric-cutting and holding apparatus constructed in accordance with the present invention.

Fig. 2 is a transverse sectional view thereof taken on the line 2—2 of Fig. 1.

Fig. 3 is a section on the line 3—3 of Fig. 1, showing one of the sheet-retaining pawls.

In the drawings I have shown my invention incorporated with a standard type of fabric-cutting machine having a longitudinally-grooved table 10 for supporting the fabric sheet as it approaches the cutter, an angularly-disposed cutter having a lower fixed blade 11 and an upper vertically-reciprocating blade 12 at the forward end of this table, and a series of parallel, endless take-off belts 13 which receive the strips 14 cut from the leading end of the rubberized sheet 15 and carry them away from the cutter. A transversely-disposed under-plate 16, having spaced forwardly-projecting fingers 17, is mounted on a rock-shaft 18 in back of but adjacent to the fixed cutter blade 11, and may be oscillated by means of a rod 19 to raise the leading end of the sheet above the blade 11, in order that said end may be seized by the sheet-feeding gripper.

This gripper is of the usual construction including under jaws 20 and individually-pivoted upper jaws 120 having a common retracting means 21, all mounted on an obliquely-disposed carrier bar 210. This bar is horizontally reciprocated by means of a pair of cables 22 which advance the jaws under the knife 12 to grip the leading end of the sheet, and then retract them to draw the sheet forward a distance equal to the width of the strip to be severed, the jaws being automatically opened and closed in the usual way by suitable mechanism including a stationary cam 23. The head 24, carrying the movable knife-blade 12, sheet-end lifter operating rod 19, and the gripper-moving cables 22 are operated in the proper sequence automatically to sever a strip from the leading end of the sheet, raise the sheet end, and advance the sheet.

It has been found in practice that the drag on the sheet due to drawing it over the table from the stock-supplying rolls and to the action of the ordinary tension roll (not here shown) on the sheet, often cause its leading end to retract slightly after the gripping jaws have let go, thus leaving less than the desired width of sheet projecting beyond the cutter after the sheet has been advanced, or allowing the cut edge to shrink back after a strip has been severed, so far that the gripper jaws will not grip the leading edge to the desired depth and so will not advance the sheet the proper distance beyond the knife between cuts. These difficulties I have overcome by providing a series of pawls 25 mounted behind the cutter on a rock-shaft 26 which is carried by upstanding brackets 27 rigidly connected to the plate 16, for retaining the sheet 15 against backward movement. Shaft 26 is mounted parallel to the cutter blades 11, 12 and the pawls project forwardly parallel to the direction of movement of the sheet, each pawl having a sharpened or pointed sheet-engaging tip as indicated in the drawing (see especially Fig. 3), which indents or bites into the fabric when the latter tends to retract, and thus arrests the recoil of the latter. The angle made by a line connecting the tip and hinge-axis of the pawl is such as to promote this positive gripping action, and obviously if the pawl-end were provided with another form of gripper than the pointed tip, the same effect might be obtained by selecting a sufficiently steep angle for the pawl. Each pawl is loosely mounted on the shaft 26 in back of and above the point of contact of the pawl with the sheet so that the direction of movement of the latter controls the action of the pawl, a backward movement of the sheet causing the lower forwardly projecting end of the pawl to positively engage the sheet as contrasted with a frictional engagement therewith, and a forward movement of the sheet releasing the pawl. Each pawl is held in position on the shaft 26 by a collar 28 and pin 29, the latter also acting as a lift-pin in conjunction with a pin 30 on the hub of the pawl. 31 is a handle attached to the shaft 26 and movable downwardly to rock the shaft and cause the pawls to be raised and thus release the sheet 15 when desired. Springs 32 connect the brackets 27 with a fixed frame member 33 and relieve the plate 16 of the weight of the shaft 26 and pawls 25 which would otherwise tilt the plate on its axis and raise the sheet above the fixed knife-blade 11 when the cutter is operating.

The operation of my invention has been made clear in the foregoing description, and it will be seen that I have provided a novel combination of cutter, sheet-feeding gripper, and sheet-retaining check-pawls which overcomes the described difficulties heretofore attending the operation of horizontal bias cutters. I am aware that it is not broadly new to provide check-pawls to retain the work, in wood-working and other machinery, and I do not claim broadly the use of such an instrumentality.

An important feature of the invention is the raising or lowering of a sheet gripping element by moving the sheet forward or backward, and it is within the scope of the present invention to employ other mechanical expedients than the pawl construction shown to effect a control of the sheet gripping means by the direction of movement of the sheet.

I claim:

1. In sheet-cutting apparatus, the combination of intermittently-acting sheet-feeding grippers, means for severing transverse strips from the end of the sheet, and sheet-recoil arresting means comprising a transverse series of sheet-operated, independently pivoted automatic checking devices individually operative to permit free passage of the sheet during its feeding movement and positively to grip the same due to an initial retracting movement thereof when the feeding grippers are released.

2. In sheet-cutting apparatus, the combination of sheet-cutting means, sheet-feeding means, sheet-recoil arresting means comprising a transverse series of sheet-operated, independently-pivoted automatic checking devices individually operative to permit free passage of the sheet during its feeding movement and positively to grip the same due to an initial retracting movement thereof, and means common to said devices for moving them to an inoperative position.

3. In a sheet-cutting apparatus, the combination of reciprocating sheet-feeding means adapted to grasp the leading margin of the sheet, a shearing device through which the sheet is intermittently drawn by said feeding means, and a device for preventing recession of the sheet and for holding its leading margin clear of said shearing device, in position to be grasped by said feeding means, between shearing operations, said device comprising a member having a part adapted to bear against one face of said margin and a set of pointed, work-engaging pawls adapted to engage the opposite face of said margin when the latter is in shearing position as well as when it is in position to be grasped by said feeding means, said part and the points of said pawls being adapted to move together, in a direction transverse to the plane of the sheet, while grasping the work, from one of said positions to the other.

4. In a sheet-cutting apparatus, the combination of reciprocating sheet-feeding means adapted to grasp the leading margin of the sheet, a shearing device through which the sheet is intermittently drawn by said feeding means, and a device for preventing recession of the sheet and for holding its leading margin clear of said shearing device, in position to be grasped by said feeding means, between shearing operations, said device comprising a tiltable member adjacent said shearing device adapted to bear against one face of the leading margin of the sheet and a plurality of pawls having sheet-engaging sharpened tips adapted to engage the opposite face of said margin, the pawls being supported by and tiltable with said member.

5. In sheet-cutting apparatus, the combination of intermittently-acting sheet-feeding grippers, a cutting member past which the sheet is intermittently drawn by said grippers, a pivoted member on one side of the sheet adapted to clear the cut edge of the sheet from said cutting member between cutting operations, a pawl-support mounted upon said pivoted member, and a pawl pivoted upon said pawl-support and adapted to engage the opposite side of the sheet from said pivoted member and to move bodily therewith about the latter's pivot.

6. In sheet-cutting apparatus, the combination of intermittently-acting sheet-feeding grippers, a cutting member past which the sheet is intermittently drawn by said grippers, a yieldingly impelled member on one side of the sheet adapted to clear the cut edge of the sheet from said cutting member between cutting operations, a plurality of individually-pivoted pawls adapted to engage the opposite side of the sheet from said pivoted member, and means common to said pawls for moving them out of operative position.

7. In a sheet-cutting apparatus, the combination of reciprocating sheet-feeding means adapted to grasp the leading margin of the sheet, a shearing device through which the sheet is intermittently drawn by said feeding means, and a device for preventing recession of the sheet and for holding its leading margin clear of said shearing device, in position to be grasped by said feeding means, between shearing operations, said device comprising a pivoted structure including coacting sheet-embracing members positioned on opposite faces of the sheet and adapted to permit the latter to pass freely between them in a forward direction but to prevent its relative recession.

8. In a fabric cutting machine, the combination of a cutter comprising a fixed lower knife and a movable upper knife, a gripper for engaging the leading edge of the sheet of fabric to draw said sheet past the cutter, a pivoted lifter for raising the cut edge above said fixed knife to present it to the gripper, means for operating said lifter, a sheet-checking device pivoted on said lifter at a point back of the latter's pivot, and means yieldingly holding the lifter in its depressed position.

In witness whereof I have hereunto set my hand this 13th day of January, 1920.

JAMES F. HENNESSY.